(12) United States Patent
Stach

(10) Patent No.: US 6,234,581 B1
(45) Date of Patent: *May 22, 2001

(54) WHEEL FOR A MOTOR VEHICLE

(75) Inventor: Jens Stach, Eberdingen (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/202,935

(22) PCT Filed: Apr. 16, 1997

(86) PCT No.: PCT/EP97/01895

§ 371 Date: Feb. 26, 1999

§ 102(e) Date: Feb. 26, 1999

(87) PCT Pub. No.: WO97/49565

PCT Pub. Date: Dec. 31, 1997

(30) Foreign Application Priority Data

Jun. 25, 1996 (DE) .............................. 196 25 271

(51) Int. Cl.⁷ .................................... B60B 3/08
(52) U.S. Cl. ............................. 301/64.2; 301/65
(58) Field of Search ................. 301/63.1, 64.1, 301/64.2, 64.3, 65, 105.1

(56) References Cited

U.S. PATENT DOCUMENTS

| 1,468,085 | * | 9/1923 | Schenck et al. ............ 301/65 |
| 1,626,211 | * | 4/1927 | Reed .......................... 301/65 |
| 1,745,973 | * | 2/1930 | Bellamore ................ 301/63.1 |
| 1,850,344 | * | 3/1932 | Eksergian ................ 301/64.1 |
| 5,538,329 | | 7/1996 | Stach .......................... 301/65 |
| 5,575,539 | | 11/1996 | Stach .......................... 301/65 |
| 6,024,415 | * | 2/2000 | Stach ....................... 301/65 X |

FOREIGN PATENT DOCUMENTS

| 74 16 695 | 8/1974 | (DE) . |
| 44 30 489 | 10/1995 | (DE) . |
| 0 552 436 | 7/1993 | (EP) . |
| 606 811 | 6/1926 | (FR) . |

* cited by examiner

Primary Examiner—Russell D. Stormer
(74) Attorney, Agent, or Firm—Evenson, McKeown, Edwards & Lenahan, P.L.L.C.

(57) ABSTRACT

A wheel for a motor vehicle consists of a rim spider having air openings and of a rim well connected therewith. The wheel comprises at least two shell parts constructed as a rim well and as a rim spider with one molded-out interior and exterior wall respectively, which are connected with one another, and radially extending hollow spokes as well as at least one exterior and one interior annulus forming between meeting wall areas of adjacent air openings of the shell parts.

12 Claims, 3 Drawing Sheets

WHEEL FOR A MOTOR VEHICLE

BACKGROUND AND SUMMARY OF THE INVENTION

The invention relates to a wheel for a motor vehicle having a rim spider with air openings and a rim well connected with the rim spider. More particularly, the wheel includes at least two shell parts constructed as a rim well and a rim spider which each have a shaped-out interior and exterior wall which are connected with one another. The shell parts define radially extending hollow spokes and a radially outer annulus and a radially inner annulus between meeting wall areas of adjacent air openings of the shell parts. Receiving devices for mounting bolts are provided between adjacent air openings of the wheel in the area of the wheel hub.

From U.S. Pat. No. 4,610,482, a vehicle wheel is known which has a rim spider which is connected with a rim well by means of a weld, air openings, and mounting bores situated partially opposite the air openings.

In European Patent Document EP-A-0 768 191, a vehicle wheel is described which comprises two shell parts which form hollow spokes in the connected condition. The receiving devices for the mounting bolts of the wheel are each assigned to one air opening; that is, they are arranged directly below the rounding of the air opening facing the wheel hub so that the air opening surface is bounded by the receiving devices. Furthermore, from German Patent Document DE-U-74 16 695, a vehicle wheel is known which has air openings and these are partially arranged below the air openings close to the wheel center. In addition, from German Patent Document DE-A-44 30 489, a vehicle wheel is known which has hollow spokes and an exterior and interior annulus, between which air openings are arranged.

It is an object of the invention to provide an arrangement of the receiving devices for the mounting bolts in the wheel which, in addition to an increased stability in the wheel hub area, also permits a free design of the air openings.

According to the invention, this object is achieved by arranging the receiving devices on a circle, in a transverse center plane of the hollow spokes, and at a distance from a contact circle with the air openings. The air openings are constructed in an approximately triangular shape with rounded corners, with the rounded corner pointing to the wheel center facing an area between two adjacent receiving devices. The receiving devices are shaped out on the end side of the hollow ribs in the shell part of the rim spider and are connected with the rim sleeve. The rim sleeve is held, fitted in an interior ring of a shaping-out of the interior annulus by the shell part of the rim well and is connected with it.

The principal advantages achieved by the invention are that, as the result of the arrangement of the receiving devices for the mounting bolts of the wheel in an area of the wheel hub between the air openings of the wheel, the sizes of the air openings do not have to be limited. Furthermore, the area in a center plane of the air openings is not weakened by a bore for the wheel mounting bolts.

The wheel hub area of the rim spider shell part is formed by the cylindrically shaped-out receiving device for the mounting bolt with hub sleeves molded on in the interior. These cylindrical receiving devices project into a recessed annulus of the rim well shell part.

For connecting the two shell parts, the hub sleeve is fitted into an interior ring of the recessed annulus.

The recessed annulus is arranged on the end side of the hollow rib or half the hollow rib of the rim well shell part and can therefore easily be produced by a casting or forming process. This also applies to the manufacturing of the rim spider. A hydroforming process can also be used.

In contrast to the air openings according to European Patent Document EP-A-0 768 191, the air openings are provided with a shaped-out rounding which extends to the space between two mountings of the wheel and therefore results in a larger opening surface.

Diecast shells can be used for the shell parts which are preferably connected by means of an electron beam welding process. Other welding processes are also conceivable.

The materials for the shell parts consist of light-metal alloys, such as an aluminum alloy or a magnesium alloy. The two shell parts may consist of the same materials or of different materials, as, for example, of an aluminum alloy and a magnesium alloy.

Other objects, advantages and novel features of the present invention will become apparent from the following detailed description of the invention when considered in conjunction with the accompanying drawings.

DETAILED DESCRIPTION OF THE DRAWINGS

Figure 1:
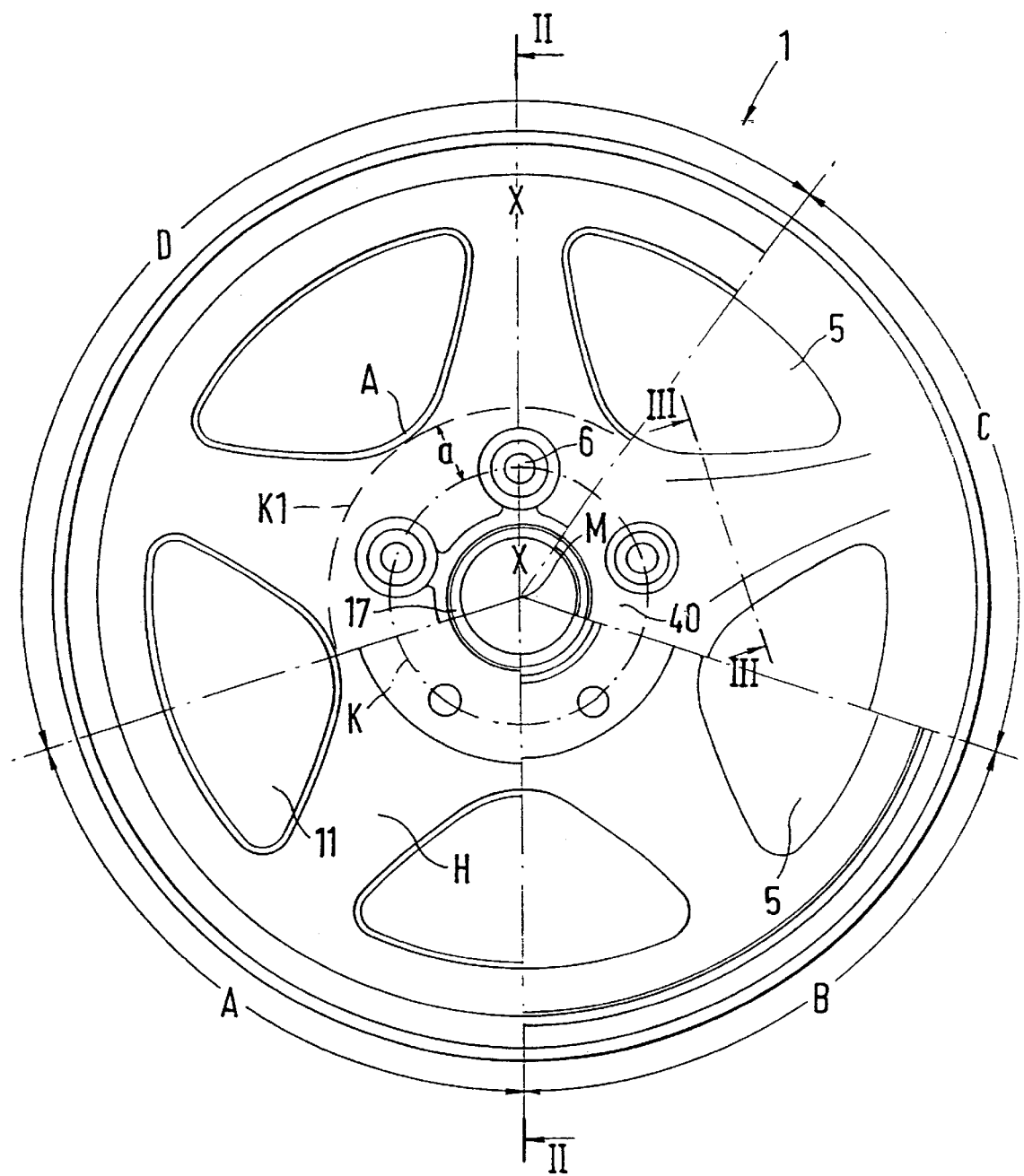
FIG. 1 is a partially cut-away view showing the inside and the outside of the exterior shell and the inside and the outside of the interior shell of the vehicle wheel formed of two shell parts.
Figure 2:
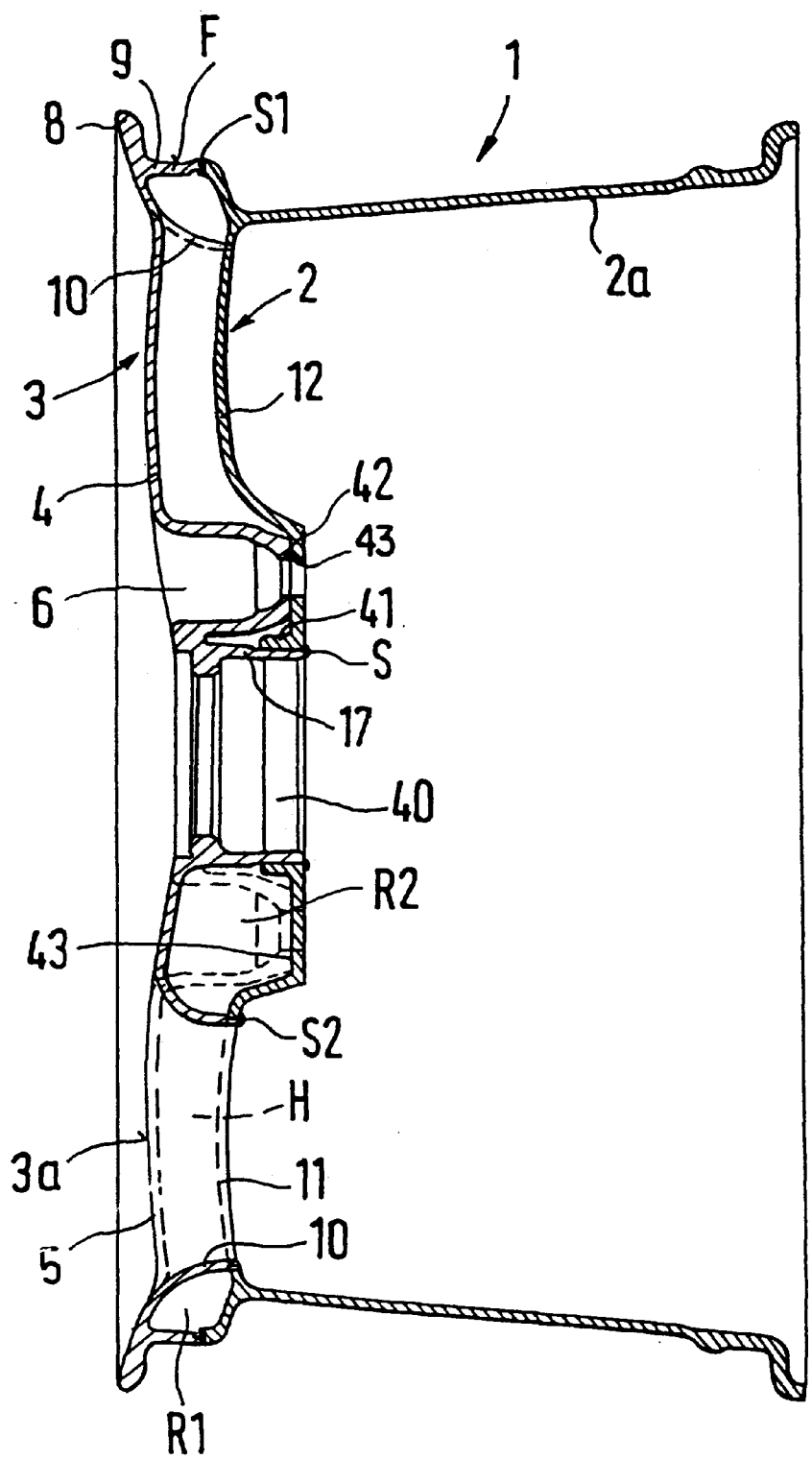
FIG. 2 is a sectional view according to Line II—II of FIG. 1.
Figure 3:
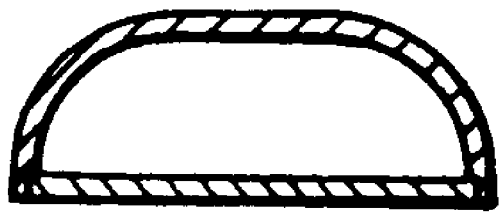
FIG. 3 is a sectional view according to Line III—III of FIG. 1.

The wheel 1 consists essentially of two shell parts 2, 3 which represent the rim well 2a and the rim spider 3a. These shell parts 2 and 3 are manufactured separately, are fitted together and are undetachably connected with one another, for example, by means of welding or gluing S, S1, S2, S3.

The rim spider 3a forms the exterior part of the wheel 1 and comprises an exterior wall 4, in which the air openings 5 and the cylindrical receiving devices 6 for the wheel mounting bolts are provided which are arranged around a hub sleeve 17.

The exterior edge of the rim spider 3 is formed by a rim flange 8 which is adjoined by a ring web 9 which extends into the interior of the rim and is part of a hump surface F.

For forming air ducts, the air openings 5 in the rim spider 3a have inwardly bent boundary walls 10 which project into the adjacent air openings 11 of the rim well 2a. These boundary walls 10 form hollow spokes H between the air openings 5 and 11, which hollow spokes H on the end side lead into concentric annuli R1 and R2 of the wheel 1.

The cylindrical receiving devices 6 in the shell part 3 of the rim spider 3a are arranged in the area of the wheel hub 40 in each case between two adjacent air openings 5 and extend approximately on a center transverse plane X—X of the hollow spoke H. In the illustrated embodiment, the cylindrical receiving devices 6 are arranged on a circle K which is situated at a distance a from the circle K1 which contacts the roundings of the air openings 5 pointing to the wheel hub.

The receiving devices 6 are shaped out on the end side of the hollow ribs H in the shell part 3 of the rim spider 3a and are connected with a molded-on hub sleeve 17 which, being fitted into an interior ring 41 of a ring shaping 42, is provided in the shell part 2 of the rim well 2*a*.

The ring shaping 42 has a recessed annulus 43 which points to the receiving device 6 and in which the bottom of the shaping 42 is supported.

The air openings 5 have an approximately triangular shape and may each be rounded on the corner side, the one shaping A, which points to the wheel center, being arranged in a plane X—X which extends through the wheel center point M, and the receiving devices 6 and the wheel mounting bolts being arranged on both sides of this plane X—X.

Diecast shells or formed parts are used for the wheel parts and are connected with one another by means of welding, particularly by means of electron beam welding. The materials of the wheel parts consist of a light metal alloy, such as an aluminum alloy or a magnesium alloy. Shell parts of different or the same materials may be combined and welded together.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel for a motor vehicle having a rim spider with air openings and a rim well connected with the rim spider, the wheel including a rim well shell part forming the rim well and a rim spider shell part forming the rim spider, the shell parts providing interior and exterior walls of the wheel which are connected with one another to define an internal cavity and radially extending hollow spokes separated by air openings, radially inward ends of the air openings forming a contact circle, the wheel further including a plurality of receiving devices for mounting bolts provided between respective adjacent ones of the air openings around a hub of the wheel, wherein the receiving devices are arranged in a circle with each situated in a transverse center plane of one of the hollow spokes at a distance radially inwardly from the contact circle of the air openings, the air openings being constructed in an approximately triangular shape with rounded corners and arranged to point towards the wheel hub between adjacent receiving devices, wherein the receiving devices are formed at end regions of the hollow spokes in the rim spider shell part, wherein the wheel hub has a sleeve and the rim well shell part has an interior ring, and wherein the receiving devices are connected with the sleeve of the wheel hub, the sleeve being fitted to the interior ring of the rim well shell part.

2. A wheel according to claim 1, wherein the interior ring is formed in a shaped portion of the rim well shell part and has a recessed annulus which faces the receiving device, said annulus being formed in an interior wall of the hollow spokes of the rim well.

3. A wheel according to claim 1, wherein the shell parts are diecast shells, and wherein the shell parts are connected with one another by means of an electron beam welding process at areas around edges of the air openings, at areas of the hub sleeve and the interior ring, and along a peripheral ring web.

4. A wheel according to claim 2, wherein the shell parts are diecast shells, and wherein the shell parts are connected with one another by means of an electron beam welding process at areas around edges of the air openings, at areas of the hub sleeve and the interior ring, and along a peripheral ring web.

5. A wheel according to claim 1, wherein the two shell parts of the wheel consist of similar light-metal alloy material.

6. A wheel according to claim 2, wherein the two shell parts of the wheel consist of similar light-metal alloy material.

7. A wheel according to claim 3, wherein the two shell parts of the wheel consist of similar light-metal alloy material.

8. A wheel according to claim 4, wherein the two shell parts of the wheel consist of similar light-metal alloy material.

9. A wheel according to claim 1, wherein the two shell parts of the wheel consist of dissimilar light-metal alloy material.

10. A wheel according to claim 2, wherein the two shell parts of the wheel consist of dissimilar light-metal alloy material.

11. A wheel according to claim 3, wherein the two shell parts of the wheel consist of dissimilar light-metal alloy material.

12. A wheel according to claim 4, wherein the two shell parts of the wheel consist of dissimilar light-metal alloy material.

* * * * *